(12) United States Patent
Michel et al.

(10) Patent No.: US 7,709,979 B2
(45) Date of Patent: May 4, 2010

(54) HEAT PIPE-EQUIPPED COOLING DEVICE FOR A ROTATING ELECTRIC MACHINE

(75) Inventors: Fakes Michel, Seclin (FR); Claudiu Vasilescu, Paris (FR); Daniel Richard, Boussy Saint Antoine (FR)

(73) Assignee: Valeo Equipements Electriques Moteur, Creteil (FR)

( * ) Notice: Subject to any disclaimer, the term of this patent is extended or adjusted under 35 U.S.C. 154(b) by 0 days.

(21) Appl. No.: 12/091,065

(22) PCT Filed: Dec. 5, 2006

(86) PCT No.: PCT/FR2006/051283

§ 371 (c)(1),
(2), (4) Date: Apr. 22, 2008

(87) PCT Pub. No.: WO2007/066038

PCT Pub. Date: Jun. 14, 2007

(65) Prior Publication Data

US 2009/0045686 A1    Feb. 19, 2009

(30) Foreign Application Priority Data

Dec. 8, 2005 (FR) ................................. 05 12467

(51) Int. Cl.
*H02K 9/00* (2006.01)
(52) U.S. Cl. .......................................... 310/52; 310/64
(58) Field of Classification Search ................... 310/52, 310/54, 58, 64
See application file for complete search history.

(56) References Cited

U.S. PATENT DOCUMENTS

| | | | |
|---|---|---|---|
| 4,295,067 A | 10/1981 | Binder et al. | |
| 7,102,267 B2 * | 9/2006 | Gromoll et al. | 310/260 |
| 7,378,766 B2 * | 5/2008 | Vasilescu et al. | 310/58 |

FOREIGN PATENT DOCUMENTS

| | | |
|---|---|---|
| FR | 2790149 | 8/2000 |
| FR | 2855673 | 12/2004 |
| JP | 56-108098 | 8/1981 |
| JP | 63-198778 | 8/1988 |
| JP | 63-262044 | 10/1988 |
| JP | 2-275294 | 11/1990 |
| JP | 9-074727 | 3/1997 |
| JP | 2004-28561 | * 1/2004 |

OTHER PUBLICATIONS

Translation for JP2004-28561.*

* cited by examiner

*Primary Examiner*—Nguyen N Hanh
(74) *Attorney, Agent, or Firm*—Berenato & White, LLC

(57) ABSTRACT

A cooling device comprising a heat pipe (6) which is provided with an electrically-isolating part (15) between the evaporating (8) and condensing (7) parts thereof, such that the hot and cold areas are isolated electrically from one another. The evaporating part (7) of the heat pipe (6, 60, 61) is connected to a voltage regulator (2) or to a current rectifier belonging to a rotating electric machine. The invention is suitable for an alternator or an alternator-starter.

9 Claims, 3 Drawing Sheets

HEAT PIPE-EQUIPPED COOLING DEVICE FOR A ROTATING ELECTRIC MACHINE

CROSS-REFERENCE TO RELATED APPLICATIONS AND CLAIM TO PRIORITY

This application relates to International Application No. PCT/FR2006/051283 filed Dec. 5, 2006 and French Patent Application No. 0512467 filed Dec. 8, 2005, of which the disclosures are incorporated herein by reference and to which priority is claimed.

FIELD OF THE INVENTION

The invention concerns a cooling device comprising a heat pipe, the evaporation part of which is situated in a hot zone and the condensation part in a cold, the said heat pipe being intended to discharge the heat from the hot zone to the cold zone.

PRIOR ART

Cooling devices of this type are already known but, because the heat pipe is produced from an electrically conductive material, the hot and cold zones must necessarily have the same electrical potential.

OBJECT OF THE INVENTION

The aim of the present invention is to mitigate this drawback.

To achieve this aim, the cooling device according to the invention provided with a heat pipe comprising, between these discharge and condensation parts, an electrically insulating part so that the hot and cold zones are electrically isolated from each other, is characterised in that the evaporation part of the heat pipe is connected to a voltage regulator or to a current rectifying device belonging to a rotary electrical machine.

SUMMARY DESCRIPTION OF THE DRAWINGS

The invention will be better understood, and other aims, characteristics, details and advantages thereof will emerge more clearly during the following explanatory description made with reference to the accompanying schematic drawings given solely by way of example illustrating an embodiment of the invention and in which.

DESCRIPTION OF THE INVENTION

Figure 1:
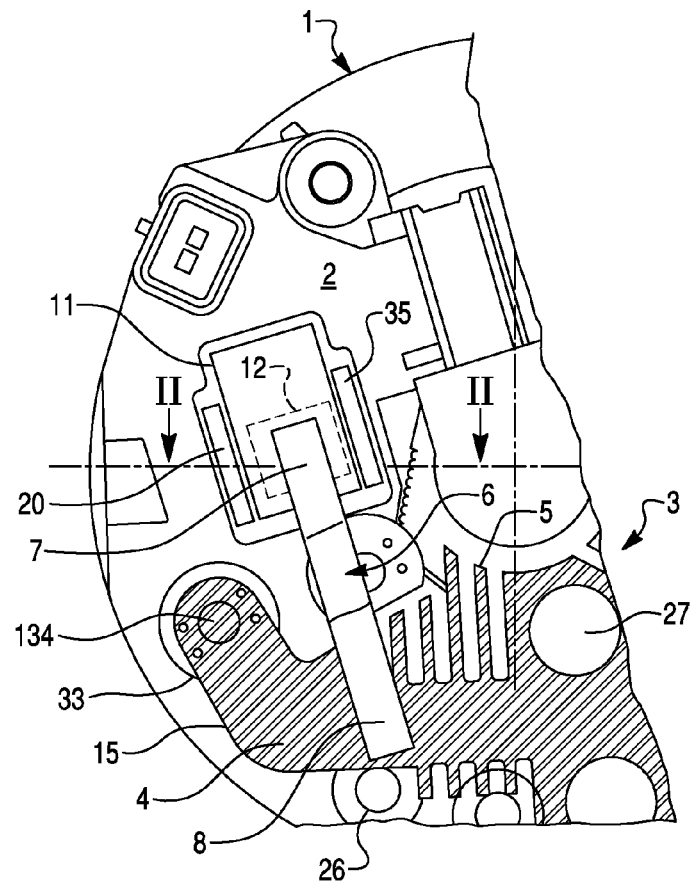
FIG. 1 is a plan view of a part of a rear bearing housing of a rotary electrical machine and schematically illustrates an application of the invention.

The invention will be described below in its application to a rear bearing housing of a rotary electrical machine. This application is however given only by way of example.

This rotary electrical machine is for example a polyphase alternator in particular for a motor vehicle. This alternator comprises a hollow-shaped casing comprising at least one front bearing housing and one rear bearing housing. This casing is intended to be mounted on a fixed part.

Inside there is housed a stator surrounding a rotor fixed to a shaft mounted for rotation in the casing by means of bearings, such as ball bearings, carried centrally respectively by the rear bearing housing and the front bearing housing.

The stator comprises a grooved stator body carrying a stator coil comprising windings, the number of which varies according in particular to the number of phases that the alternator has. The body of the stator is carried by the casing, being located at the external periphery thereof. This body consists for example of a packet of metal sheets.

An air gap exists between the internal periphery of the stator body and the external periphery of the rotor.

The rotor is for example a claw rotor or a projecting-pole rotor.

The shaft passes centrally through the rotor while being rotationally connected to it for example by force fitting, the shaft comprising for this purpose at least one portion with reliefs force fitted in the central opening that the rotor has for this purpose.

The front end of the shaft passes through the front bearing and carries a drive member, such as a pulley or toothed wheel, belonging to a movement transmission device, for example with belt(s) or chain(s), acting between the shaft or the alternator and the crankshaft of the motor vehicle thermal engine.

The rotor comprises a rotor body, preferably made from ferromagnetic material. At least one excitation winding is associated with the body. When the exciting winding is supplied electrically, the body of the rotor is magnetised with the formation of magnetic poles, the rotor body being configured accordingly.

An induced current then occurs in the stator winding when the shaft turns.

This induced current is of the alternating type so that a rectifying device is provided, such as a diode bridge or a transistor bridge of the MOSFET type, in order to transform the alternating current into a direct current so as to electrically supply at least one load, such as a load belonging to the onboard system of the vehicle and/or a battery.

The current rectifying device is provided with several arms and is usually carried by the rear bearing housing of the rotary electrical machine. This device comprises a positive dissipator carrying positive rectifying elements, for example positive diodes, a negative dissipator carrying negative rectifying elements, such as negative diodes, and a connector made from electrically insulating material carrying electrical connections to electrically connect together the rectifying elements in order to form arms of the rectifying device, such as a diode bridge, and to electrically connect the outputs of the windings, connected for example in a star or delta, of the stator coil to the rectifying device.

The negative dissipator is electrically connected to earth, while the positive dissipator carries an output terminal, referred to as the B+ terminal, intended to be connected to the positive terminal of a battery.

These dissipaters are in one embodiment metal. Advantageously the negative dissipator consists of the hollow-shaped rear bearing housing bottom.

The excitation coil of the rotor is electrically connected to a voltage regulator in order to limit the voltage produced by the alternator and protect the loads.

In one embodiment the alternator is brushless and the excitation coil is fixed.

In another embodiment the alternator has brushes and the excitation coil is carried by the rotor body.

In this case the rear end of the shaft carries two collecting rings connected by cabled connections to the ends of the excitation winding.

Brushes are intended to rub on the collecting rings. These brushes are mounted in a brush holder usually belonging to a brush-holder regulating assembly also carried by the rear bearing housing.

By way of example reference will be made to the document WO 02/29958 disclosing, in the context of an alternator with brushes and a rectifying device in the form of a diode bridge, such an arrangement more clearly visible in FIGS. 7 and 14 to 17 of this document.

In this document the rotor is a claw rotor provided with a body comprising two pole pieces between which a core carrying the excitation coil is interposed. This alternator is air cooled. To do this the rotor carries a fan at each of its axial ends and the front and rear bearing housings of the casing are provided with air inlet and outlet openings for the internal circulation of the air by means of the fans.

This circulation of the air cools the stator windings as well as the bridge rectifier and the assembly consisting of voltage regulator and brush holder covered by a perforated protective cap and fixedly connected to the rear bearing.

The voltage regulator comprises a subassembly comprising for example a substrate on which at least one elementary electronic component such as a chip is mounted.

This regulator assumes the regulation of the supply voltage for the battery and its loads. It can be of the single-function type or multifunction type in order in particular to dialogue with at least one computer and/or provide the detection of faults, such as the detection of the absence of rotation or the detection of the breakage of the belt.

FIG. 1 shows a rear bearing housing part designated by 1 of a rotary electrical machine, with a conventional structure, for example of the type described in the aforementioned document WO 02/29958.

This rear bearing housing 1 is therefore hollow in shape and comprises a bottom, visible in FIG. 1, provided centrally with air passage openings and extended at its external periphery by a peripheral rim adjacent to the stator. This rim is also provided with air passage openings.

FIG. 1 does not show the protective cap covering the rectifying device, here a diode bridge, in order better to see the parts covered by this cap.

Thus, in this figure, the assembly comprising the voltage regulator and the brush holder is denoted by the reference numeral 2, while the reference numeral 33 denotes a lug belonging to the positive dissipator 4 of the current rectifying device 3 comprising rectifying elements in the form of diodes. The negative dissipator consists here of the bottom of the rear bearing housing carrying diodes 26, referred to as negative diodes, some of which are visible in FIG. 1. The positive dissipator 4, advantageously metal, also carries diodes 27, referred to as positive diodes. A connector, not visible, acts between the two dissipators. The positive dissipator 4 is provided here with cooling fins 5.

The aim of the invention consists of providing the cooling, in one embodiment of the voltage regulator 2, comprising a part, such as at least one track 14, connected to the negative potential.

Figure 2:
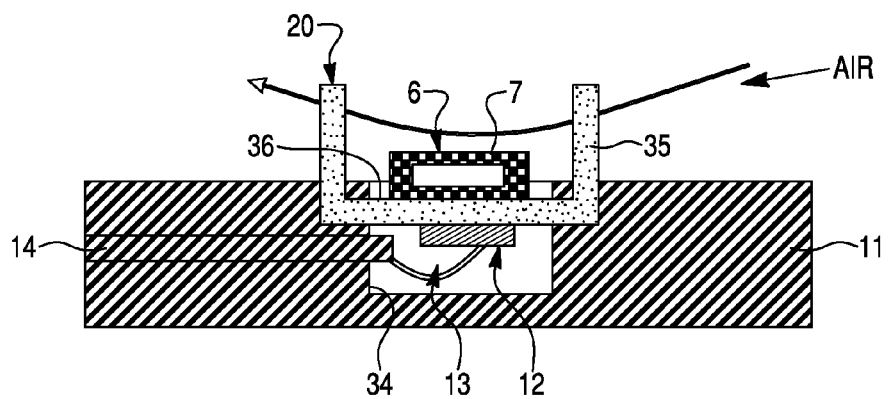
FIG. 2 is a partial view in section along the line 2-2 in FIG. 1.
Figure 3:
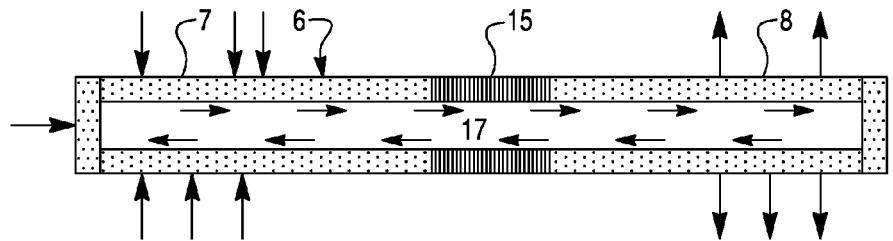
FIG. 3 is a view in section of the heat pipe in FIG. 1 mounted on the voltage regulator of FIG. 1.

In accordance with the invention, in the embodiment in FIGS. 1 to 3, the cooling is carried out by means of heat pipe 6, the evaporation part 7 of which is associated with the voltage regulator constituting a hot source, while the condensation part 8 is associated with a cold source. The parts 7 and 8 are electrically conductive.

In this figure the cold source is the positive dissipator 4 of the current rectifying device 3. The condensation part 8 of the heat pipe is mounted on the positive dissipator 4, or more precisely in the vicinity of the cooling fins 5 of the dissipator 4.

This condensation part is also located in the vicinity of the lug 33 of the dissipator 4. This lug 33 serves for mounting the B+ terminal attached for example by screwing to the lug 33 perforated for this purpose. In FIG. 1 this hole can be seen at 134. This B+ terminal is connected by a cable to the positive terminal of the battery constituting a cold source. The cable therefore makes it possible to discharge the heat so that the lug 33 is a cold zone, which is at positive potential.

The condensation part 8 of the heat pipe 6 is therefore mounted alongside a cold zone of the positive dissipator 4 well cooled by virtue of the fins 5.

The evaporation part 7 of the heat pipe 6 is mounted, for example, as illustrated in FIG. 2, which shows at 11 a layer of plastics material belonging to the voltage regulator and disposed on the rear bearing housing 1, and at 12 at least one electronic component, such as a chip, of the voltage regulator, the housing of which is connected by an electrical connection wire 13 to a metal electrical connection track 14 connected to a reference potential. This track extends in the layer 11. In the case shown, the evaporation part 7 of the heat pipe 6 is in indirect contact with the chip while being mounted on a heat dissipating plate 20, but any other known mounting possibility, such as mounting on a heat dissipator for example provided with cooling fins, can be envisaged. The plate 20 is secured to the layer 11.

More precisely the plate 20 is here metal and has a U-shaped cross-section with two fins 35 and a bottom 36. The heat pipe 6 extends by its part 7 in contact with the top face of the bottom 36, while the tip 12 extends in contact with the bottom face of the bottom 36. The evaporation part 7 and the chip 12 therefore extend on each side of the bottom 36. This part 7 of the heat pipe 6 and the chip 12 are fixed to the bottom 36 of the plate 20 by means of a heat-conducting glue. In a variant these components are fixed to the bottom 36 by brazing.

It will be noted that the layer 11 has a cavity 34 for housing the chip 12, the part 7, to a major extent the bottom 36, the connection wire 13 and the visible free end of the track 14 electrically connected to the wire 13.

The ends of the bottom 36 and the bottom parts of the fins 35 are anchored in the layer 11, for example by the insert moulding technique. It should be noted that the track 14 is here at negative potential.

The fins 35 extend perpendicular to the layer 11 and are cooled by circulation of the air, shown schematically by an arrow in FIG. 2, so that the plate 20 is a heat dissipating plate forming a heat dissipator.

On the condensation side 8, the heat pipe is fixed, in any suitable manner, for example by brazing or adhesive bonding, to the positive dissipator 4 of the bridge of diodes grouped in pairs, each pair comprising in a known manner a positive diode and a negative diode.

However, the chip of the regulator, connected to the track 14 at negative potential, and the positive dissipator 4 of the diode bridge, at positive potential, have different electrical potentials, so that the use of a known heat pipe would cause a short-circuit between the two potentials.

To resolve this problem, it is proposed to use a heat pipe as shown in FIG. 3, which comprises, between its evaporation 7 and condensation 8 parts, which are electrically conductive, an electrically insulating part 14 whilst preserving the qualities of thermal superconductor of the heat pipe. Thus the evaporator part and the condenser part of the heat pipe made from a thermally and electrically conductive material are separated by the insulating part 15, these three parts put end to end being designed so as not to modify the transport of the heat-transfer fluid 17 within the heat pipe for discharging the heat from the voltage regulator 2 to the positive dissipator 4, without any risk of a short-circuit, by virtue of the insulating part 15.

For the record it should be stated that the heat pipe 6 comprises a sealed enclosure, here 7, 15, 8, inside which there is the heat-transfer fluid 17.

In an economical embodiment the parts 7, 8 are made from copper or nickel and the heat-transfer fluid 17 is water.

In another embodiment the heat-transfer fluid is ammonia solution and the parts 7, 8 made from nickel, aluminium or stainless steel.

In yet another embodiment the parts 7, 8 are made from nickel, copper or stainless steel and the heat-transfer fluid is methanol.

Naturally the parts 7, 8 can be made from several materials.

For example, the parts 7, 8 can be made from steel plated internally with copper, the heat-transfer fluid being water.

The insulating part 15 is in one embodiment made from plastics material.

In the embodiment in FIG. 3 the heat pipe is of the capillary pumping type.

The heat-transfer fluid 17 is in equilibrium with its vapour. There is a small quantity of liquid in contact with the parts 7, 15, 8 so that the parts 7 and 8 are well insulated electrically despite the presence of liquid in the insulating part 15.

In one embodiment these hollow-shaped parts 7, 15, 8 are provided with grooves for capillary pumping of the heat-transfer fluid.

This FIG. 3 depicts by arrows the circulation of the liquid 17 in the enclosure 7, 15, 8 and, outside, the absorption of heat in the part 7 and the discharge of heat in the part 8 have also respectively been shown schematically by arrows.

It should be noted that a heat pipe as shown in FIG. 3 providing an electrically insulating part between its electrically conductive evaporation and condensation parts can be used, as a cooling means, in all cases of application where the elements or devices to which the two parts of the heat pipe are connected have different electrical potentials.

Figure 6:
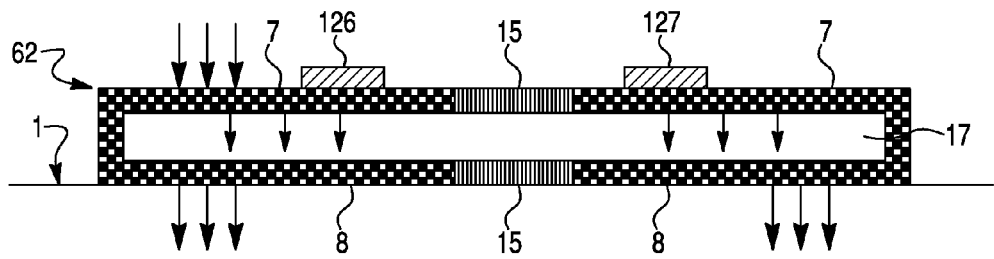

Thus, in the embodiment in FIG. 6, the heat pipe 62 can serve as a support for electronic components 126, 127 in the form of chips, such as diodes or transistors, of the current rectifying device as can be seen in FIG. 6.

The chips 126, 127 can consist of diodes or transistors of the MOSFET type. These chips belong to the current rectifying device 1.

The number of diodes or transistors of the MOSFET type depends on the number of phases of the rotary electrical machine. The chips 126 correspond to the negative diodes 26 in FIG. 1 and the chips 127 to the positive diodes 27 in FIG. 1. The heat pipe 62 therefore serves as a support for the rectifying device.

In this case the heat pipe is flat and has on one of its faces two evaporation parts 7, electrically conductive, separated by an electrically insulating part 15, and on the other of its faces two condensation parts 8, electrically conductive, separated by an electrically insulating part 15. The condensation parts 8 are here mounted on the rear bearing housing 1, forming a heat dissipator. In a variant the heat pipe 62 is in contact with a heat dissipating bridge forming a mezzanine above the rear bridge as described in the document WO 2004/040738, to which reference should be made.

In this figure the circulation of the heat-transfer fluid 17 within the enclosure 7, 15, 8 has been shown by arrows, as in FIG. 3, and the absorption of heat and the discharge of heat outside by arrows.

The chips 126, 127 are fixed directly, for example by adhesive bonding or brazing, to the evaporation part 7. In a variant the chips are fixed indirectly to the evaporation part 7 for example by a heat-dissipating plate, for example of the type in FIG. 1.

Naturally in a variant it is possible to mount only the chips 127, at positive potential, on the evaporation part 7 of the heat pipe 6 in FIG. 3.

The heat pipe therefore has at least one evaporation part and one condensation part separated by an electrically insulating part.

The heat pipe can have any appropriate form, for example be a flat heat pipe in the aforementioned manner or of any other form, provided that it comprises an electrically insulating part between these two evaporation and condensation parts.

Likewise it is possible to modify the dissipator or dissipators 20, 4, the rear bearing 1 or the mezzanine in order to be able to fix the condensation part of the heat pipe by screwing, riveting, snapping on or crimping.

The evaporation part can also be fixed by screwing, riveting, snapping on or crimping.

Figure 4:
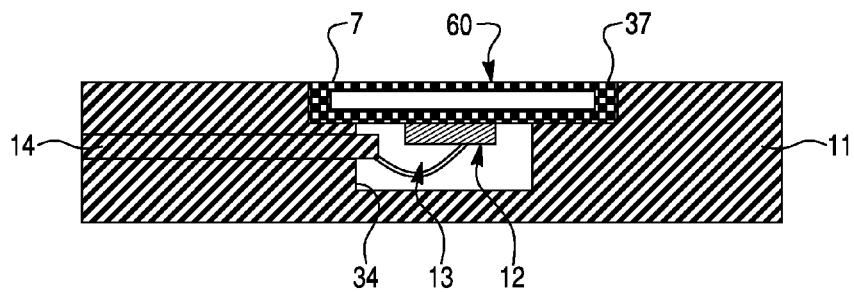
FIGS. 4 to 6 are views similar to FIG. 2 for respectively a second, third and fourth embodiment according to the invention.

In a variant, as can be seen in FIG. 4, the chip 12 is fixed directly, for example by adhesive bonding, to the evaporation part 7 of the heat pipe 60. In this case the heat pipe 60 is wider than the heat pipe 6 in FIG. 1 and the cavity 34 comprises a widened top part 37 for receiving the part 7.

The cavity 34 is therefore stepped.

Figure 5:
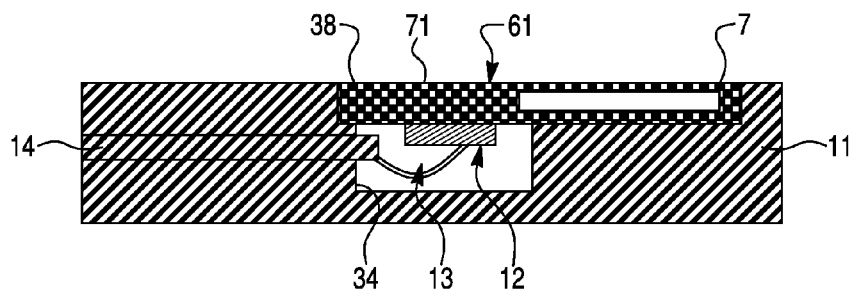

In a variant, as can be seen in FIG. 5, the top part 38 of the stepped cavity 34 is widened further in order to house an even wider heat pipe 61 so that the evaporation zone 7 is offset with respect to the chip 12 fixed to a solid part 71 of the heat pipe adjacent to the evaporation part 7.

Naturally the present invention is not limited to the example embodiment described.

The rotor of the machine may be a projecting-pole rotor.

In a variant, as described in the document DE 40 187 10, the machine may comprise two claw rotors and two stators.

The machine may be water cooled.

For example, one of the bearing housings of the casing may be provided with air passage openings so as to be cooled by a circulation of the air created by a fan secured to the rotor or shaft, while the other bearing housing comprises at least one channel connected to an inlet and outlet connection so as to be cooled by circulation of a liquid. This cooling liquid may in one embodiment be the cooling liquid for the internal combustion engine or thermal engine of the motor vehicle.

The bottom of the rear bearing housing or of the front bearing housing may therefore be cooled by circulation of a liquid.

The machine may be cooled solely by circulation of a liquid, the casing of the machine comprising in the aforementioned manner at least one cooling fluid circulation channel as described in the document DE 40 187 10.

The fan may be located outside as in the documents DE 30 12 636 and JP 56199707.

As a result, considering these two documents, the rectifying device and the voltage regulator and the B+ terminal are in a variant carried by the front bearing housing of the machine or in a variant located between the bottom, for example, of the rear bearing housing, and the rotor of the machine. As a result also the B+ terminal is in a variant carried by the front bearing housing or the rear bearing housing constituting a cover.

In a variant the current rectifying device, the voltage regulator and the B+ terminal may be located at the external periphery of the casing.

In a variant it is possible to double the number of components as can be seen in FIG. 2 of the aforementioned document DE 40 187 10.

In this case the heat pipe with an electrically insulating part connects between the two voltage regulators, constituting the hot source, to a cold source. The heat pipe can in one embodiment have a T shape with a head, formed by the two evaporation parts connected together, and a vertical part connected to a cold source. It is possible for the cold source and the hot source not to have the same potential by virtue of the heat pipe.

In a variant a heat pipe with an electrically insulating part and in the form of a T has a head that carries the positive diodes of the two rectifying devices, its vertical part being connected to a cold source at negative potential, such as the casing.

Another T-shaped heat pipe can carry the negative diodes of the two rectifying devices.

All combinations are possible, the heat pipe of the type in FIG. 6 being able to carry at least the positive diodes and be in contact with the voltage regulator.

The same heat pipe can therefore carry electronic elements belonging to different devices.

The cold source is in a variant a portion of the casing cooled by circulation of liquid.

In the previous embodiments the heat dissipated by the chip is discharged by forced convention via the heat pipe.

In a variant it is possible to discharge the heat by conduction in a cold part of the alternator.

In another embodiment the condensation part of the heat pipe is located in a cooling chamber of the alternator with the cooling liquid passing through it.

The rotary electrical machine is in a variant an alternator starter, that is to say a reversible alternator making it possible also to convert electrical energy into mechanical energy in particular to start the internal combustion engine of the motor vehicle. In this case the current rectifying device advantageously comprises transistors of the MOSFET type and can, in one embodiment, be mounted, as well as the voltage regulator, in an external housing of the machine with the intervention of cables between the housing and the machine as described in the document FR A 2 745 445, to which reference should be made.

Thus the brush holder can be distinct from the voltage regulator. The heat pipe according to the invention acts between the voltage regulator and the external housing containing the rectifying device and the voltage regulator.

This housing comprises a bottom closed by a metal cover forming a heat dissipator. The heat pipe advantageously acts between the voltage regulator and the heat dissipator forming a cold source.

The voltage regulator can be provided with several tracks 14.

Figure 7:
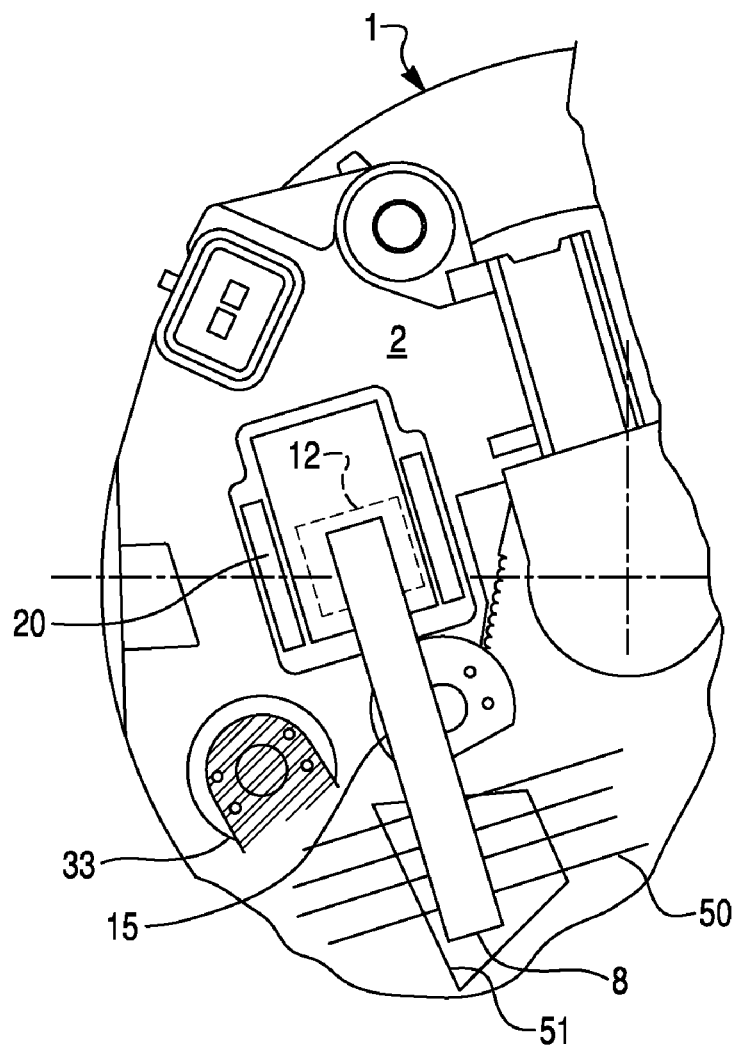
FIG. 7 is a view similar to FIG. 1 for a fifth example embodiment of the invention.

Naturally all combinations are possible. Thus it is possible to reverse the structures, for example the track 14 is in one embodiment connected to the positive potential unlike the embodiments in FIGS. 2 and 4 to 5 in which the track 14 is connected to the negative potential. Thus in a variant, as can be seen in FIG. 7, the evaporation part 7 is connected to the chip 12 at positive potential, while the condensation part 8 carries fins 50 opposite an air passage opening 51 provided here in the rear bearing 1 for circulation of the air inside the machine under the action of at least one fan secured to the rotor or shaft of the machine. By virtue of the electrically insulating part 15, interposed between the parts 7, 8, any short-circuit is avoided in the case where the fins and/or condensation part come into contact with the bearing housing 1 at negative potential. It should be noted that the part 8 is well cooled since it is located opposite the opening 51 and carries fins 50.

Naturally, in a variant to FIG. 1, the positive dissipator 4 can be equipped with a supplementary heat pipe, for example a heat pipe whose condensation zone, advantageously equipped with fins, extends opposite an opening in the front or rear bearing housing provided for the passage of air, the circulation of which is achieved by virtue of at least one fan internal or external to the machine.

It is possible to standardise the heat pipe, the cold and hot sources being able to be at the same potential or at different potentials.

The invention makes it possible to better cool the voltage regulator and/or the current rectifying device.

The invention claimed is:

1. A cooling device comprising:
   a heat pipe (6, 60, 61, 62) including evaporation (7) and condensation (8) parts situated respectively in a hot zone and a cold zone;
   the heat pipe being intended to discharge the heat from the hot zone to the cold zone;
   the heat pipe further comprising an electrically insulating part (15) disposed between the evaporation (7) and condensation (8) parts thereof so as to electrically insulate the hot and cold zones from each other;
   the evaporation part (7) of the heat pipe (6, 60, 61) being connected to a voltage regulator (2) of a rotary electrical machine;
   the condensation part (8) of the heat pipe (63) with the electrically insulating part (15) being connected to one of front and rear bearing housings of a casing of the rotary electrical machine, the rotary electrical machine being one of an alternator and an alternator-starter.

2. A cooling device comprising:
   a heat pipe (6, 60, 61, 62) including evaporation (7) and condensation (8) parts situated respectively in a hot zone and a cold zone;
   the heat pipe being intended to discharge the heat from the hot zone to the cold zone;
   the heat pipe further comprising an electrically insulating part (15) disposed between the evaporation (8) and condensation (7) parts thereof so as to electrically insulate the hot and cold zones from each other;
   the evaporation part (7) of the heat pipe (6, 60, 61, 62) being connected to a voltage regulator (2) or to a current rectifying device of a rotary electrical machine;
   the rotary electrical machine comprising a casing provided with a front bearing housing and a rear bearing housing;
   the condensation part (8) of the heat pipe (6, 60, 61, 62) with the electrically insulating part (15) being connected to one of the front and rear bearing housings, the rotary electrical machine being one of an alternator and an alternator-starter,
   one of the front and rear bearing housings carrying at least one current rectifying device comprising a positive dissipator (4) carrying rectifying elements including diodes or transistors of the MOSFET type,
   the condensation part (8) of the heat pipe (6, 60, 61) being connected to the positive dissipator (4).

3. The device according to claim 2, wherein the positive dissipator (4) is electrically insulated by the rear bearing housing (1) of the rotary electrical machine and in that the condensation part (8) of the heat pipe is connected to the positive dissipator.

4. The device according to claim 3, wherein the positive dissipator (4) has a lug (33) serving for mounting a terminal intended to be connected to the positive terminal of a battery via a cable and in that the condensation part (8) of the heat pipe (6, 60, 61) is located in the vicinity of the said lug.

5. The device according to claim 4, wherein the voltage regulator comprises at least one electronic regulation component (12) fixed directly or indirectly to the evaporation part (7) of the heat pipe (6, 60, 61, 62).

6. A cooling device comprising:
- a heat pipe (6, 60, 61, 62) including evaporation (7) and condensation (8) parts situated respectively in a hot zone and a cold zone;
- the heat pipe being intended to discharge the heat from the hot zone to the cold zone;
- the heat pipe further comprising an electrically insulating part (15) disposed between the evaporation (8) and condensation (7) parts thereof so as to electrically insulate the hot and cold zones from each other;
- the evaporation part (7) of the heat pipe (6, 60, 61, 62) being connected to a voltage regulator (2) or to a current rectifying device of a rotary electrical machine;
- the voltage regulator comprising at least one electronic regulation component (12) fixed directly or indirectly to the evaporation part (7) of the heat pipe (6, 60, 61, 62).

7. The device according to claim 6, wherein the voltage regulator comprises a layer of plastics material (11) provided with a cavity (34) for housing the electronic component (12).

8. The device according to claim 6, wherein the current rectifying device comprises at least one electronic regulation component (126, 127) fixed directly or indirectly to the evaporation part (7) of the heat pipe (62).

9. The device according to claim 6, wherein the rotary electrical machine comprises a casing provided with a front bearing housing and a rear bearing housing, wherein one of the front and rear bearing housings is provided with at least one air passage opening (51), and wherein the condensation part (8) of the heat pipe carries fines 50 opposite the air passage opening.

* * * * *